United States Patent [19]

Yabe et al.

[11] Patent Number: 5,126,184

[45] Date of Patent: Jun. 30, 1992

[54] MOLDED PART AND MOLD FOR MANUFACTURING THE SAME

[75] Inventors: Isao Yabe, Saitama; Takashi Odaka, Tokyo; Minoru Fukuda; Masao Mafune, both of Saitama, all of Japan

[73] Assignee: Citizen Watch Co., Ltd., Tokyo, Japan

[21] Appl. No.: 634,276

[22] Filed: Dec. 26, 1990

[30] Foreign Application Priority Data

Dec. 27, 1989 [JP] Japan .............................. 1-149298[U]
Nov. 9, 1990 [JP] Japan .............................. 2-117151[U]

[51] Int. Cl.⁵ .............................................. B32B 3/10
[52] U.S. Cl. .................................... 428/131; 428/137; 428/138; 428/140; 428/164; 428/192; 264/267; 264/269; 264/270; 425/554; 425/556; 425/577
[58] Field of Search ............. 428/131, 137, 192, 36.9, 428/36.91, 164, 140, 138; 264/267, 269, 270; 425/554, 556, 577; 138/177, 178, 143; 384/297, 300, 125; 249/90, 96, 97

[56] References Cited

U.S. PATENT DOCUMENTS

| 2,697,010 | 12/1954 | Hirschmugl | 264/269 |
| 3,143,364 | 8/1964 | Klein | 264/269 |
| 3,290,199 | 12/1966 | Willhoite | 264/269 |
| 3,902,241 | 9/1975 | Worner | 264/269 |
| 4,401,198 | 8/1983 | Kunczynski | 384/125 |

FOREIGN PATENT DOCUMENTS

| 209126 | 11/1984 | Japan . | |
| 290019 | 12/1986 | Japan | 264/269 |
| 1490999 | 11/1977 | United Kingdom | 384/297 |

Primary Examiner—Ellis P. Robinson
Assistant Examiner—Nasser Ahmad
Attorney, Agent, or Firm—Townsend & Townsend

[57] ABSTRACT

A molded part formed by outsert-molding a resin into a through hole of a pipe part includes a pipe part and a resin part. The pipe part includes a hole having a tapered surface whose size is gradually reduced inward from an end portion of a through hole formed in an outsert-molded part such as a metal part, and a resin part has an outer shape matching the tapered surface. The resin part is formed in the pipe part by outsert molding.

5 Claims, 14 Drawing Sheets

MOLDED PART AND MOLD FOR MANUFACTURING THE SAME

BACKGROUND OF THE INVENTION

1. Field of the Invention

The present invention relates to a molded part such as a pipe part with its through hole outsert-molded with resin and a mold used for outsert molding.

2. Description of the Prior Art

Recently, molded products have been increasingly produced, which are formed by outsert-molding a resin into a through hole of a pipe-like part.

In case resin is molded on the outer surface of a metal work (insert-molding), a stress acts in a contraction direction of the resin, and there are no adverse effects between the resin and an insert part, thus allowing desired molding. In case resin is molded on the inner surface of the metal work (outsert molding), however, since a resin contracts after molding, various adverse effects are found especially when high-precision parts are to be formed.

Outsert molding in a conventional pipe part will be described in detail below.

FIGS. 1A and 1B are sectional views of a molded part formed by outsert molding in a pipe-like part. FIG. 1A shows a state of the molded part immediately after molding. FIG. 1B shows a state of the molded part when a predetermined period of time passed after molding.

FIG. 1A shows a molded part 1 in its final form. More specifically, a metal pipe part 2 has a through hole 3 for molding a resin 5, and shoulder portions 4 at both ends of the through hole 3. The resin 5 is molded into a shape matching the through hole 3 and collar portions, which define an axial hole 7, in accordance with the shape of the pipe part 2. As shown in FIG. 1A, immediately after molding, the resin 5 flows and is formed into a shape perfectly matching the through hole 3 and the collar portions 6. However, when a given period of time elapses, the resin 5 contracts to form gaps (I)8 and (II)9 between the pipe part 2 and the resin 5. The finished molded part 1 has looseness.

A conventional mold for forming the molded part 1 will be described below with reference to FIGS. 2 to 4.

FIG. 2 is a sectional view of a conventional mold. FIG. 3 is a plan view of a fixing slide jig. FIG. 4 is a plan view of a fixing slide jig for multiple molding.

Reference numeral 10 denotes a mold constituted by a movable half mold 11 and a stationary half mold 12.

A fixing slide jig 13 having an insertion port 14 is fitted/held in the movable half mold 11. The fixing slide jig 13 serves to fix the pipe part 2 (shown in FIGS. 1A and 1B) used for outsert mold. Two inclined loose fitting holes 15 are obliquely formed in the fixing slide jig 13 so as to be symmetrical, and inclined surfaces 20 are formed on the two ends of the fixing slide jig 13. A pin 16 and a knockout pin 17 are formed on the movable half mold 11 so as to be vertically slidable. The pin 16 is used to form the axial hole 7 of the molded part 1. The knockout pin 17 is used to take out the molded product 1 from the movable half mold 11.

The stationary half mold 12 is designed to be vertical movable so as to take out the molded part 1. An open pin 18 and a positioning block 21 are fixed to the stationary die 12. The open pin 18 is engaged with the inclined loose fitting hole 15 upon upward movement of the stationary die 12 so as to laterally open the stationary slide jig 13 on a cut plane 19 as a boundary. The positioning block 21 serves to regulate the separation position of the stationary slide jig 13. Reference numeral 22 denotes a gate for injecting a resin.

An operation of the mold will be described below.

When the pipe part 2 is inserted into the insertion hole 14 and the movable half mold 11 is moved upward in FIG. 2, the open pins 18 are fitted in the inclined loose fitting holes 15, and the inclined surface 20 is brought into contact with the positioning block 21 to close the fixing slide jig 13, thus holding the pipe part 2. A resin is then injected through the gate 22 to perform outsert molding. Upon completion of outsert molding, the movable half mold 11 is moved downward. As a result, the open pins 18 are disengaged from the inclined loose fitting holes 15, and the inclined surface 20 is moved away from to the positioning block 21 to open the fixing slide jig 13 on the cut plane 19 as a boundary to form surfaces 19a and 19b. The knockout pin 17 protrudes upward to extract the molded part 1. When the pipe part 2 is inserted again, and the movable half mold 11 is lowered, the fixing slide jig 13 is closed, and the resin is injected, thereby completing the molded part 1.

FIG. 4 shows a fixing slide jig for obtaining a plurality of finished parts 1 by using five insertion holes 14a to 14e. Similar to the operation described with reference to FIG. 3, a fixing slide jig 23 is laterally opened on a cut plane 25. Pipe parts 2 are inserted into the insertion holes 14a to 14e. The fixing slide jig 23 is then closed, and a resin is injected therein, thus simultaneously forming the five molded parts 1 by molding.

In the case of the molded part shown in FIG. 1A, the molded part formed by outsert molding has a proper shape immediately after molding as shown in FIG. 1A, but the resin contracts after a lapse of a predetermine period of time. As a result, as shown in FIG. 1B, although no gaps are formed in the longitudinal direction because it coincides with a clamping direction, gaps I and II are formed between the piper part 2 and the resin 5 in the radial direction upon contraction of the resin. This impairs eccentricity precision of the outer diameter of the molded product 1 with respect to the axial hole 7.

With a further lapse of time, the eccentricity precision of the outer diameter with respect to the axial hole is further degraded due to a creep phenomenon. For this reason, a deviation of $\pm 4$ $\mu$m, of an outer diameter with respect to an axial hole, which is a precision required for rollers, cannot be expected.

With regard to a mold, when a mold for a single molded part is used, fairly high precision can be expected in outsert molding. However, when a mold for multiple molded parts is to be used to reduce the cost, which may has the structure shown in FIG. 4, since the eccentricity of a cavity is larger than that of a cavity located inward therefrom and the fixing slide jig is laterally moved, an outer diameter deviation of a molded part becomes larger than that of a molded part located inward therefrom. Therefore, it is very difficult to perform molding with desired precision.

SUMMARY OF THE INVENTION

The present invention has been made in consideration of the above drawback, and has as its object to provide a mold structure which can increase the precision of a part formed by outsert molding and which can be applied to a mold for multiple molding with high precision.

In order to achieve the above object, according to an arrangement of the present invention, a resin part is outsert-molded in a work such as a pipe part, having a through hole which is tapered inward the through hole from both ends thereof, so as to match the tapered surface of the through hole. There is also provided a mold structure in which a work is held by a holding member having a thin-walled portion displaced toward an upper die in a non-load state and having elasticity, and a slit, and a resin is injected from the upper die to perform outsert molding.

According to the above-described arrangement, a mold part is held by the displaced holding member, and the upper die is lowered to close the holding member to fix the work. At the same time, a resin is injected to perform outsert molding. Even if the resin portion of the outsert-molded part contracts, since this contraction occurs along the tapered portion of the inner surface of the pipe part, no gaps causing positional errors are formed.

BRIEF DESCRIPTION OF THE DRAWINGS

FIGS. 1A and 1B are sectional views showing a molded part formed by a conventional technique, in which FIG. 1A shows a state immediately after molding, and FIG. 1B shows a state a predetermined period of time after molding;

DETAILED DESCRIPTION OF THE PREFERRED EMBODIMENTS

Embodiments of the present invention will be described below with reference to the accompanying drawings.

Figure 1A:
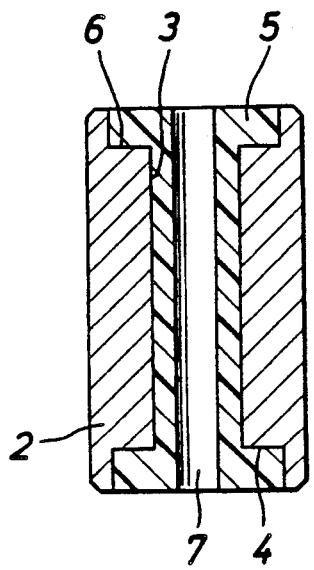
Figure 1B:
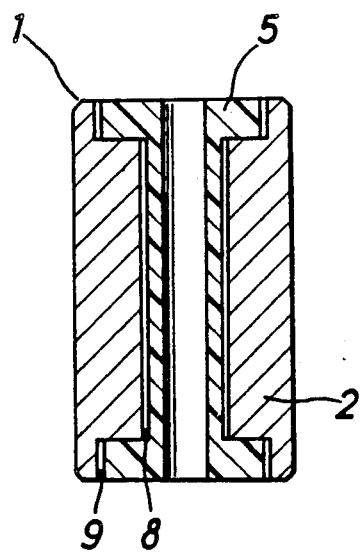
Figure 2:
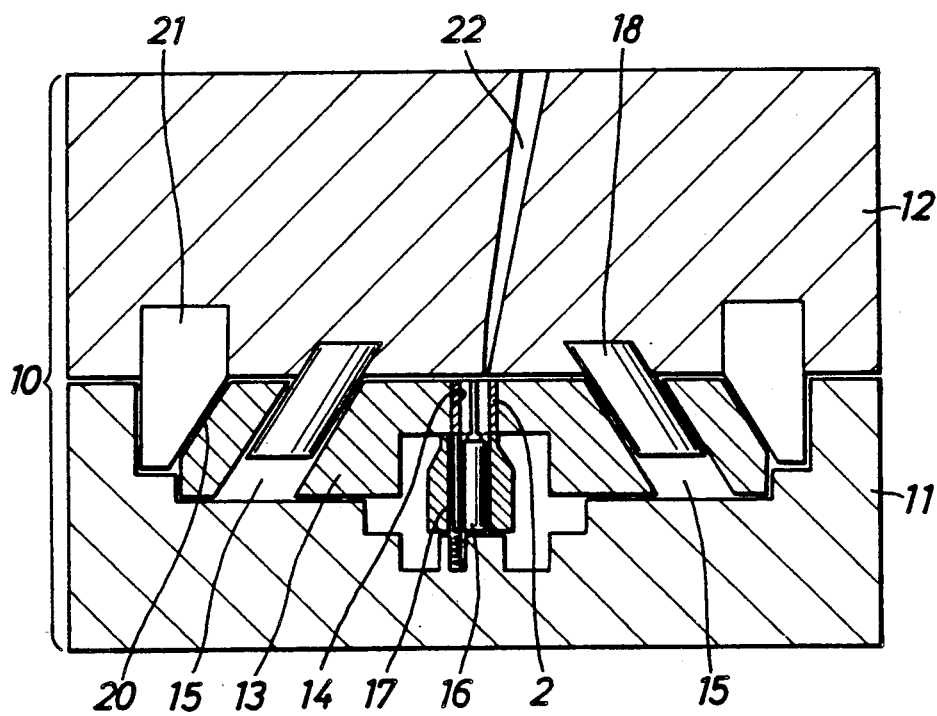
FIG. 2 is a sectional view showing a main part of a conventional mold.
Figure 3:
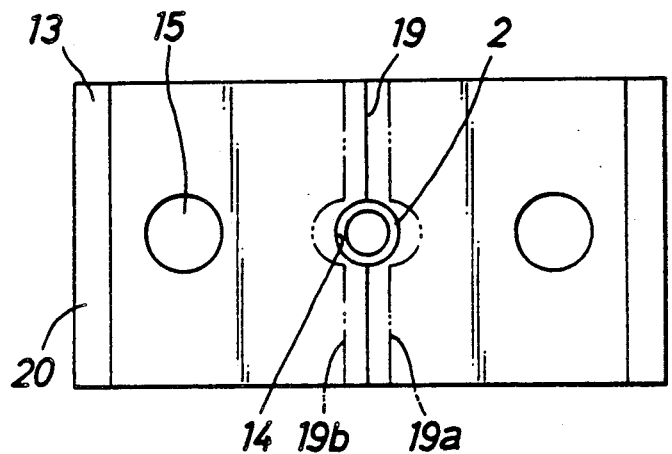
FIG. 3 is a plan view showing a main part of a fixing slide jig of a movable type.
Figure 4:
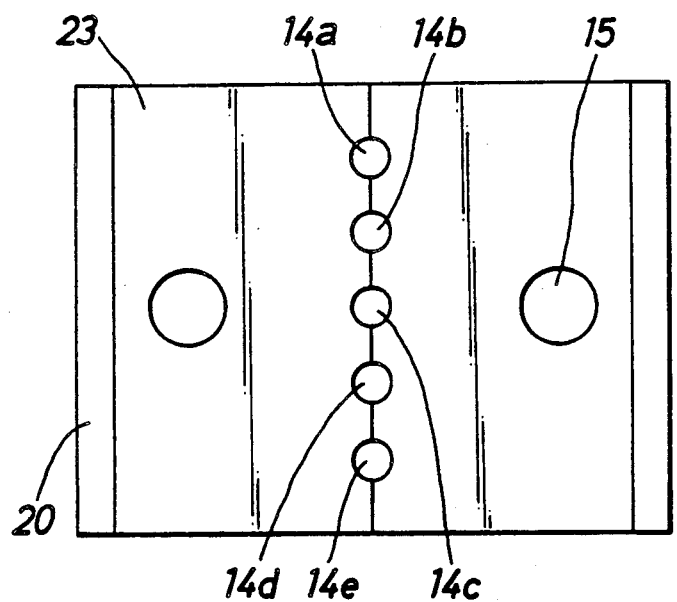
FIG. 4 is a plan view showing a main part of a conventional fixing slide jig for multiple molding.
Figure 5:
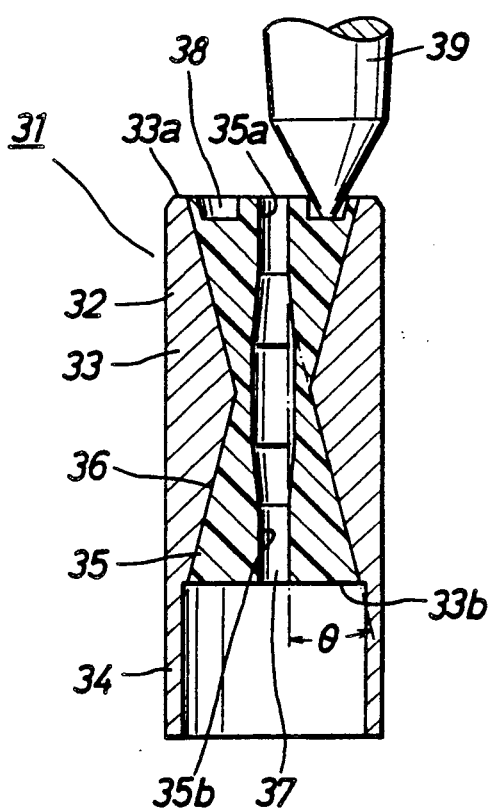
FIG. 5 is a sectional view of a roller as an embodiment of a molded part according to the present invention.

FIG. 5 is a sectional view showing a roller as an example of a molded part according to an embodiment of the present invention.

Reference numeral 31 denotes a roller as a finished product. The roller 31 comprises a pipe part 32 and a resin portion 35. The pipe part 32 is constituted by a mold portion 33 and a cylindrical portion 34. The mold portion 33 has tapered surfaces respectively extending from one end 33a and a terminal end portion 33b to a central portion in the longitudinal direction. The resin portion 35 has an axial hole 37 formed in the axis of the roller and is molded along the tapered surfaces of the mold portion 33. Reference numeral 38 denotes a groove for a gate, with which a gate 39 on a mold (to be described later) is engaged. Reference numerals 35a and 35b denote extended portions with slight bulges formed in the direction of the axial hole 37. In molding, the pipe part 32 is set in the mold, and a molten resin is injected through the gate 39, thus molding the resin portion 35. As described hereinbefore, the resin portion 35 gradually contracts when a given time elapses. However, since the contraction occurs along the tapered surfaces 36, no gaps are formed between the pipe part 32 and the resin portion 35 even with contraction, thereby completing the roller 31 as a molded product with high precision. In addition, with the extended portions 35a and 35b, a shaft can be fitted in the roller 31 in a substantially forcible fitting state.

Figure 6:
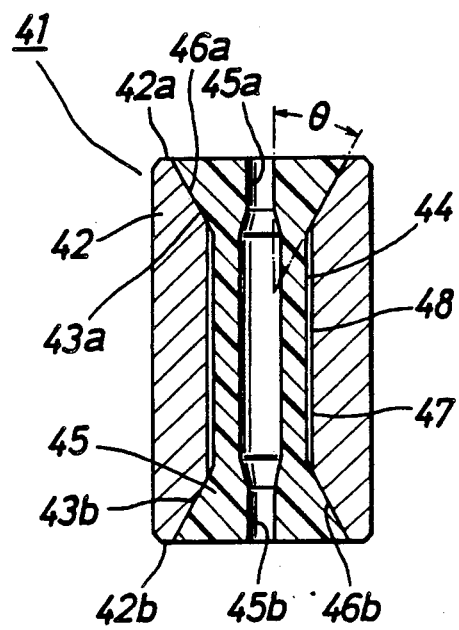
FIG. 6 is a sectional view of a roller as another embodiment of a molded part according to the present invention.

FIG. 6 is a sectional view showing a roller as an example of a molded part according to another embodiment of the present invention. A roller 41 comprises a pipe part 42 and a resin portion 45, similar to the one shown in FIG. 5. The pipe part 42 is constituted by tapered surfaces 43a and 43b whose diameters are gradually reduced from one end 42a and the other end 42b to the center, and a cylindrical surface 44. Similarly, the resin portion 45 is constituted by tapered surfaces 46a and 46b respectively extending along the tapered surfaces 43a and 43b of the resin portion 45, and a cylindrical surface 47. Reference numerals 45a and 45b denote extended portions similar to those in FIG. 5. When a resin is molded to form the resin portion 45, the resin is molded to fit in the inner surface of the pipe part 42. With a lapse of a given time, the resin contracts. As a result, a gap 48 is formed between the cylindrical surface 44 of the pipe part 42 and the cylindrical surface 47 of the resin portion 45. However, no gaps are formed between the tapered surfaces 43a and 46a and between the tapered surfaces 43b and 46b, thus obtaining the high-precision roller 41.

Figure 7:
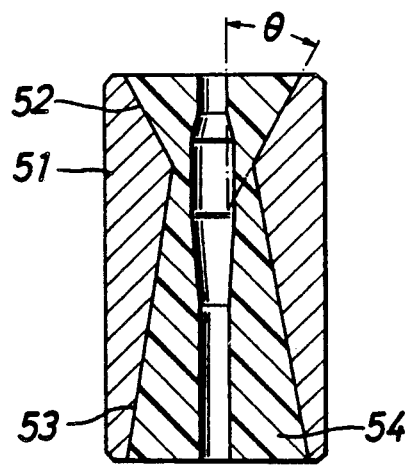
FIG. 7 is a sectional view of a roller as still another embodiment of a molded part according to the present invention.

FIG. 7 is a sectional view showing still another embodiment of the present invention. Unlike the tapered surfaces in FIG. 5 which are symmetrical about the center in the longitudinal direction, tapered surfaces in FIG. 5 are asymmetrical. More specifically, a tapered surface 52 of a pipe part 51 is shorter than a tapered surface 53. Even in the arrangement shown in FIG. 7, even if a resin portion 54 contracts, since the resin portion 54 contracts with its shape fitting the tapered surfaces 52 and 53, no gaps are formed in the radial direction, thus obtaining a high-precision finished product. Extended portions 54a and 54b are vertically asymmetrical because the degree of contraction thereof varies depending on the thickness of a resin.

In the embodiments as above described, it is preferable to select the angle made between the tapering surface and the axis of the molded pipe at its both ends to range between 40° and 45° and this was confirmed by the inventors in their experiment.

As described above, according to each finished part of the present invention, even if the resin portion contracts, since contraction occurs along the tapered surface, no gaps are formed in the radial direction, thereby providing a high-precision molded part.

A method of measuring precision of the roller shown in FIG. 5 will now be explained.

Figure 8:
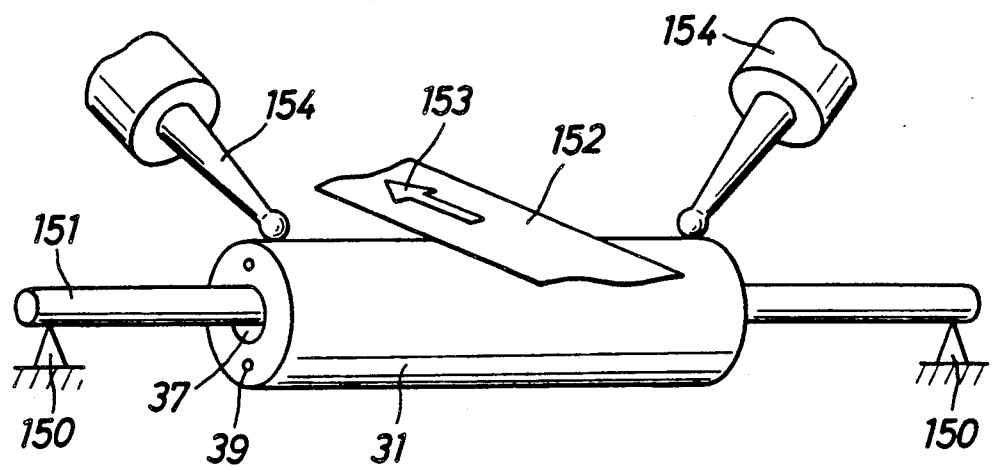
FIG. 8 is a perspective view for explaining a principle of measurement of the amount of deviation of a roller as an example of a molded part.

FIG. 8 is a perspective view showing a principle of measuring of deviation of the roller while rotating.

A supporting shaft 151 is loosely passed through a hole of a roller 31 and is fixed to a fulcrum 150. An indicator 154 is put in contact with both the side of the gate 39 and its opposite side. In this state, the roller 31 is rotated in the direction indicated by an arrow 153 by a beet 152 and amount of deviation of the roller is measured. The result of measurement of the amount of deviation was obtained as follows:

| Present invention | 5 ~ 7 μm | 3 ~ 5 μm |
|---|---|---|
| Conventional example | 50 ~ 60 μm | ← |

Figure 9:
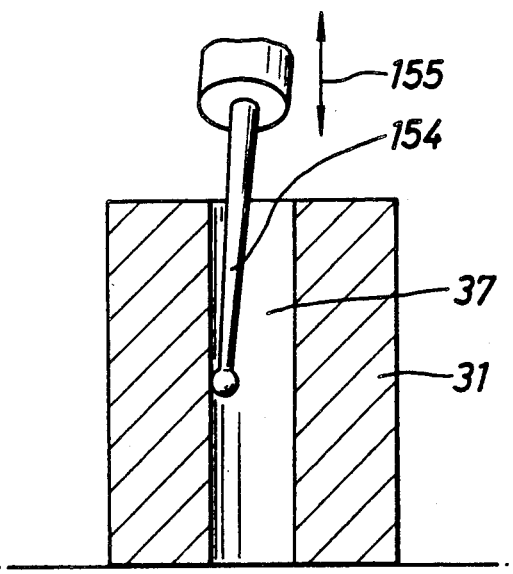
FIG. 9 is a perspective for explaining a principle of measurement of perpendicularity of the roller.

Next, FIG. 9 shows a section illustrating a principle of measuring of perpendicularity of the roller.

The roller 31 is put upright and the indicator 154 is moved up and down in the direction shown by an arrow 155 while contacting the indicator 154. The result of measurement of perpendicularity was obtained as follows:

| Present invention | 3 ~ 5 μm |
|---|---|
| Conventional example | 7 ~ 20 μm |

Figure 10:
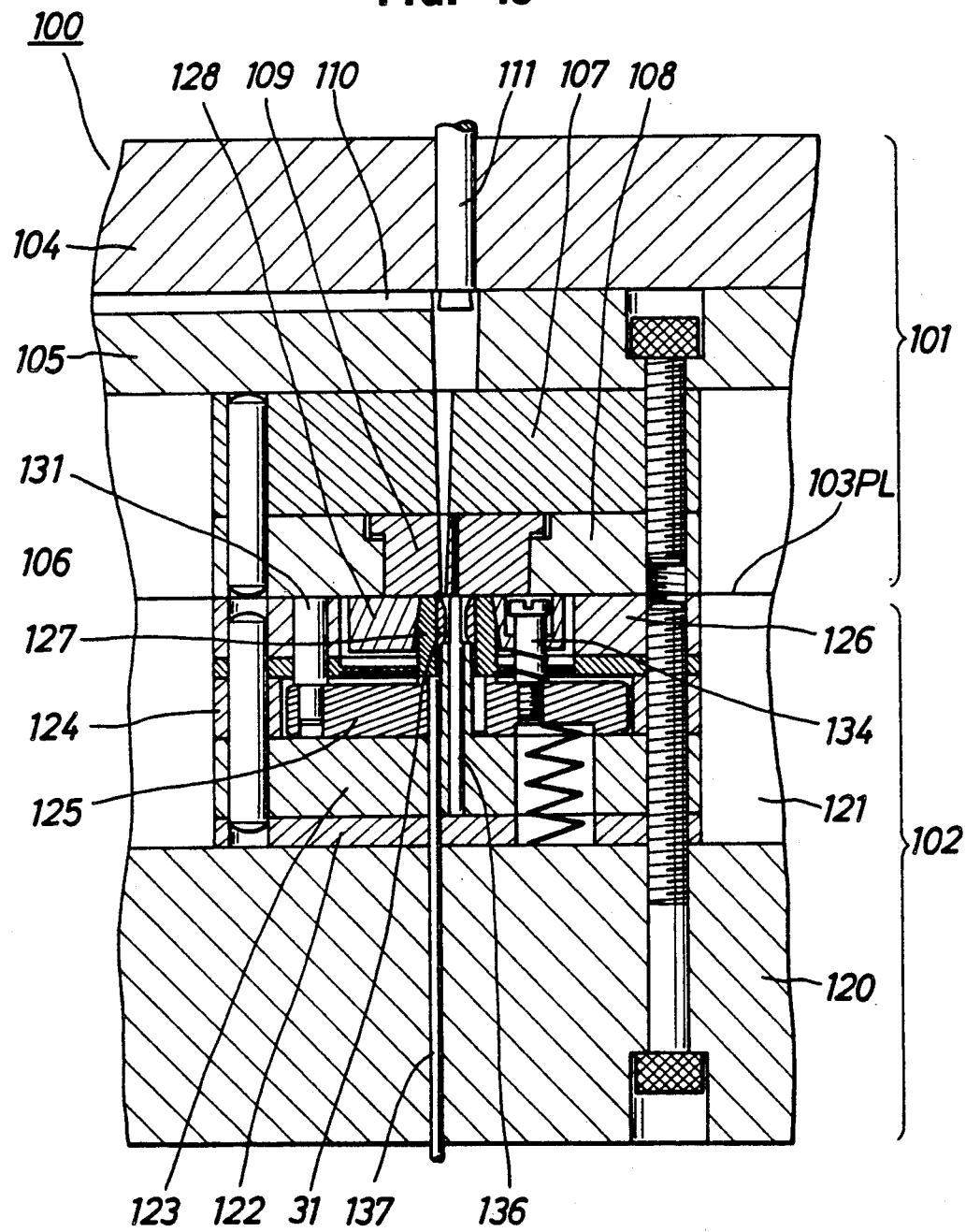
FIG. 10 is a sectional view of an embodiment of a mold according to the present invention.
Figure 11:
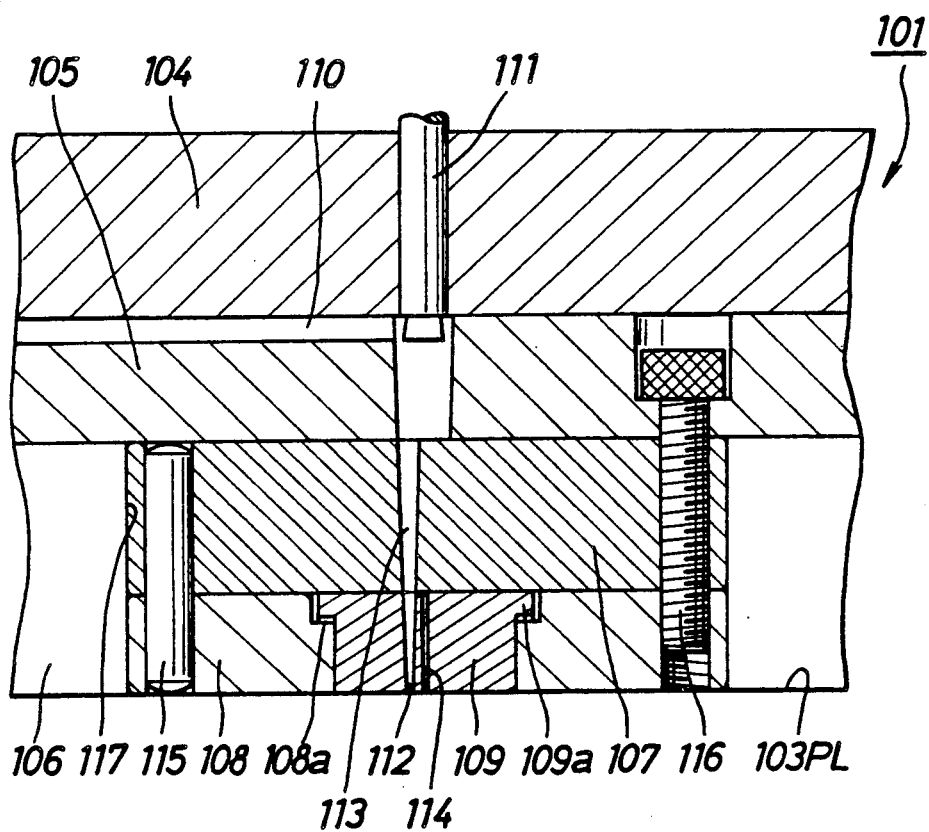
FIG. 11 is a sectional view showing a main part of the stationary half mold shown in FIG. 10.
Figure 12:
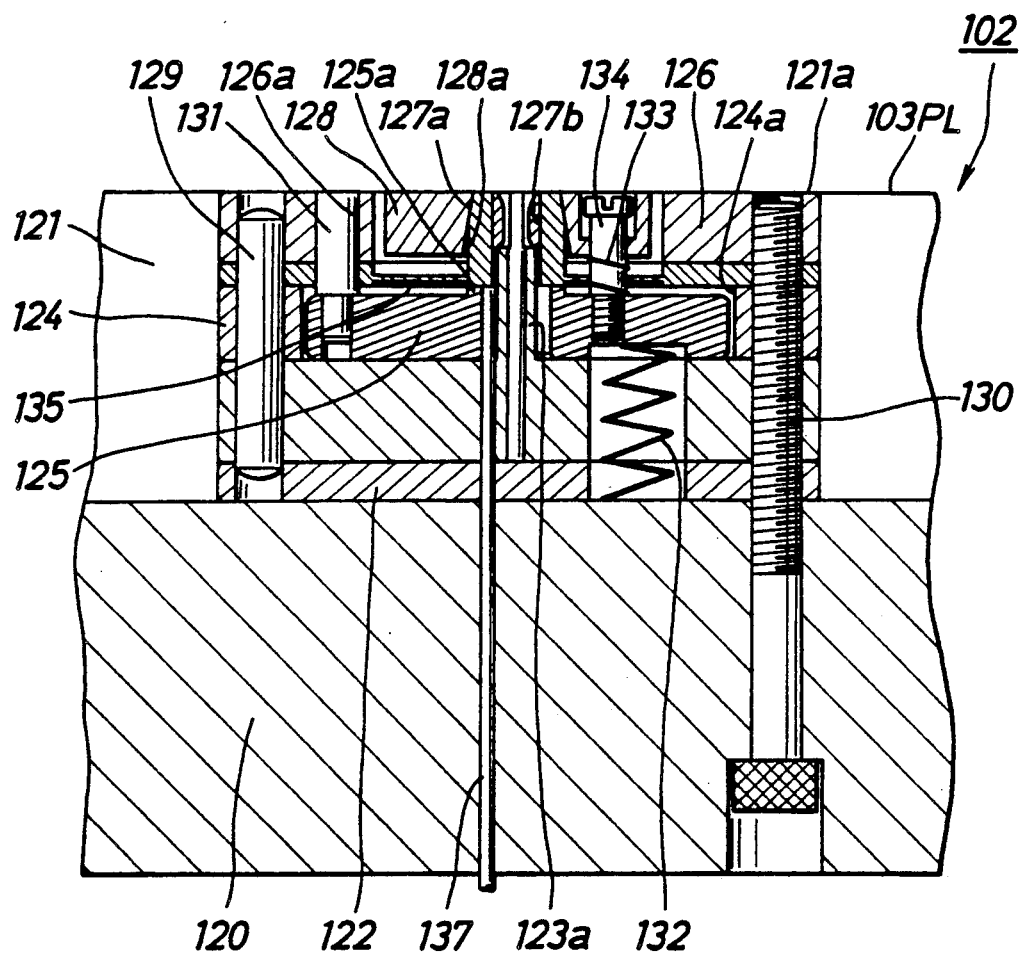
FIG. 12 is a sectional view showing a main part of the movable half mold shown in FIG. 10.
Figure 13:
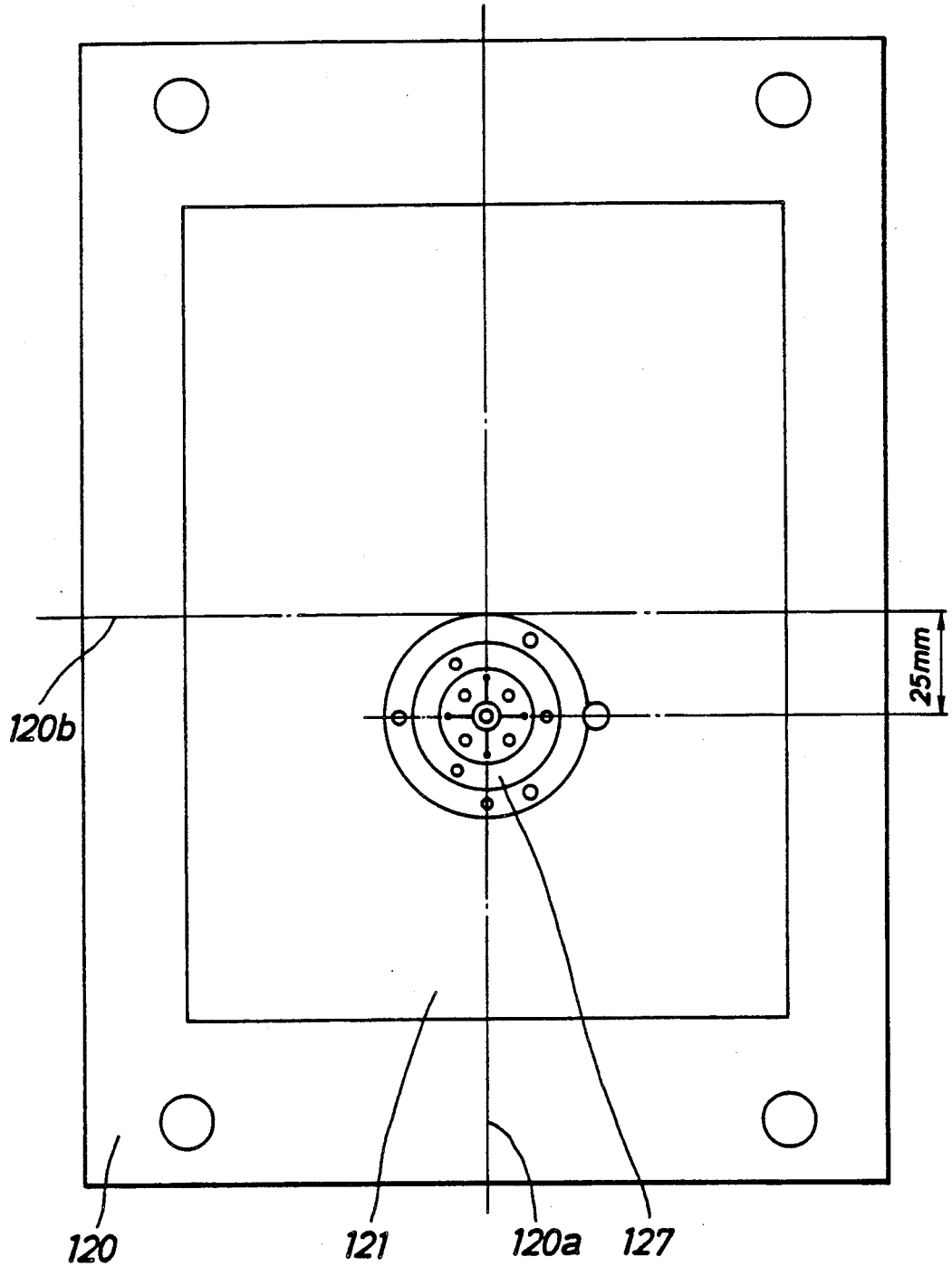
FIG. 13 is a plan view of the movable half mold.

A mold for molding the above-described rollers will be described below. FIG. 10 is a sectional view showing an assembled mold. FIG. 11 is a sectional view showing a main part of a stationary half mold. FIG. 12 is a sectional view showing a main part of a movable half mold. FIG. 13 is a plan view of the movable half mode.

An arrangement of the mold will be described first.

Referring now to FIG. 11, reference numeral 100 denotes a mold comprising a stationary half mold 101 and a movable half mold 102. A mating face of both half molds is called a parting line (to be referred to as a PL hereinafter) 103.

The stationary half mold 101 includes a stationary reception plate 105 on which a runner 110 allowing a molten resin to flow thereon is formed, and a stripper plate 104 covering the runner 110. A stationary half mold plate 106 defining the PL 103 is stacked on a side opposite to the stripper plate 104 of the stationary reception plate 105. Note that a runner pin 111 is arranged at a portion, of the stripper plate 104, corresponding to the runner 110. In addition, a through hole 117 is formed in a portion, of the stationary half mold plate 106, corresponding to the runner 110. A stationary cavity spacer 107 is engaged with the through hole 117 while a positioning pin 115 extends therefrom. A resin flow portion 113 extends in the stationary cavity spacer 107 corresponding to the runner 110. A gate 112 is formed to be continuous with the resin flow portion 113, and a stationary cavity B 109 having an escape hole 114 in its center is arranged. A stationary cavity A 108 is stacked in such a manner that it is positioned by the positioning pin 115 and is fixed by a screw 116 with its shoulder portion 109a positioned by a step 108a.

The movable half mold will be described next. The movable half mold includes a movable reception plate 120 as a base member, and a movable half mold plate 121 stacked on the movable reception plate. A through hole 121a is formed in the center of the movable half mold plate 121. In the through hole 121a, a movable cavity F 122, a movable cavity E 123, and a movable cavity C 124 are sequentially staked on each other from the movable reception plate 120 side. A movable cavity D 125 is arranged in a central through hole 124a of the movable cavity C 124. A projection 125a is formed on an upper central portion of the movable cavity D 125. A diaphragm chuck 127 is arranged in contact with the projection 125a. In addition, a movable cavity A 126 is formed to fix the diagram chuck 127 thereto with a screw 130. Note that reference numeral 128 denotes a movable cavity G.

The movable cavities F 122, E 123, and C 124, the diaphragm chuck 127, and the movable cavity A 126 are positioned by two positioning pins 129 and are fixed by through screws 130. Three float pins 131 are fixed to the movable cavity D 125 so as to be vertically slidable in holes 126a ad 127g respectively formed in the movable cavity A 126 and in the diaphragm chuck 127. This sliding movement is performed by a spring 132 arranged in the movable cavity E 123. In addition, the movable cavity G 128 is fixed to the movable cavity D 125 with four regulation pins 134 respectively having springs 133 wound therearound so as to be vertically moved upon sliding movement of the movable cavity D 125. A central hole 128a of the movable cavity G 128 is tapered and is engaged with a tapered portion of a distal end portion 127a of the diaphragm chuck 127 so as to open/close the diaphragm chuck 127 upon vertical movement of the movable cavity G 128.

A projection-like work mounting portion 123a is formed in the movable cavity E 123 to extend to an intermediate portion of a chuck hole 127b of the diaphragm chuck 127. A movable core pin 136 is fitted in the center of the work mounting portion 123a. Furthermore, an ejector pin 137 for ejecting a work extends from the movable reception plate 120.

The diaphragm 127 is positioned by the movable die plate 121 fixed to the movable reception plate 120 and is placed at a position located on a central line 120a in the width direction and shifted downward from a central line 120b in the longitudinal direction by 25 mm.

Figure 14:
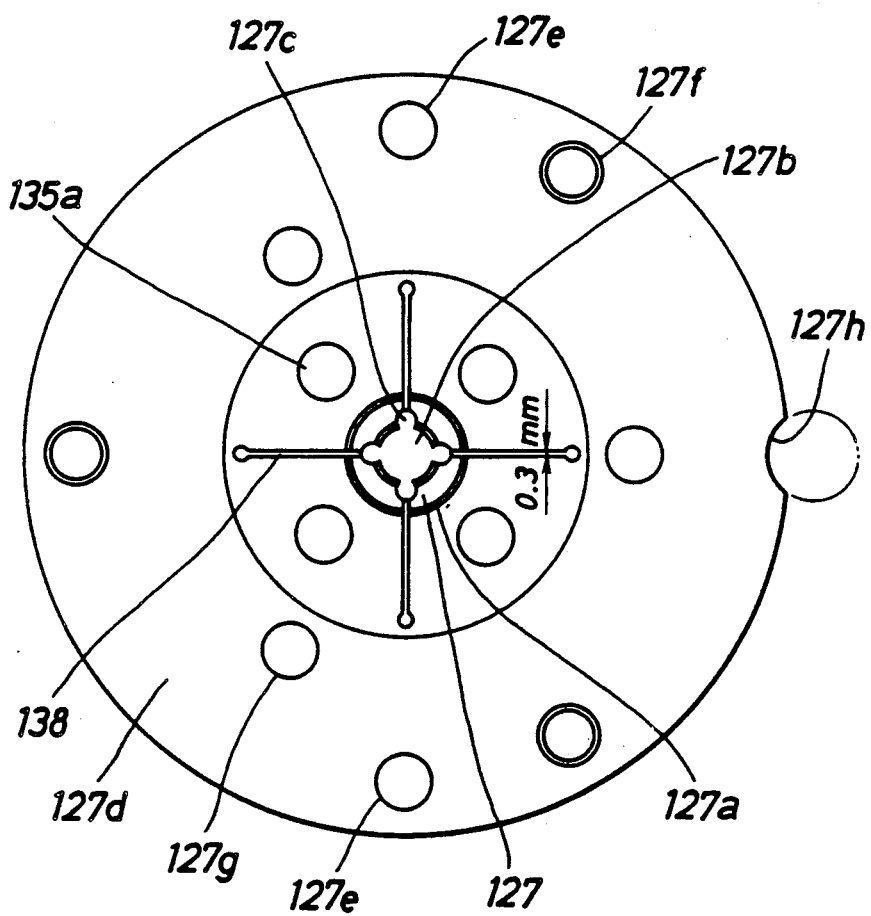
FIG. 14 is a plan view of a diaphragm chuck.

FIG. 14 is a plan view of the diaphragm chuck. The diaphragm will be described in detail below with reference to FIG. 14.

The following holes are formed in a base 127d located below the movable cavity A 126: two pin holes 127e with which the positioning pins 129 are engaged; three screw holes 127f with which the screws 130 are threadably engaged; and three pin holes 127g with which the float pins 131 are engaged.

The chuck hole 127b having an escape portion 127c is formed in the center of the diaphragm chuck 127, and the tapered distal end 127a is formed on the outer surface of the diaphragm chuck 127 (see FIG. 12).

The base 127d of the diaphragm is coupled to the diaphragm chuck 127 through a thin plate portion 135.

Four pin holes 135a through which the regulation pins 134 extend are formed in the thin plate portion 135. In addition, four slits 138 each having a width of 0.3 mm are formed to extend from the thin plate portion 135 to the escape portion 127c of the diaphragm chuck 127. Reference numeral 127h denotes a positioning portion.

Figure 15:
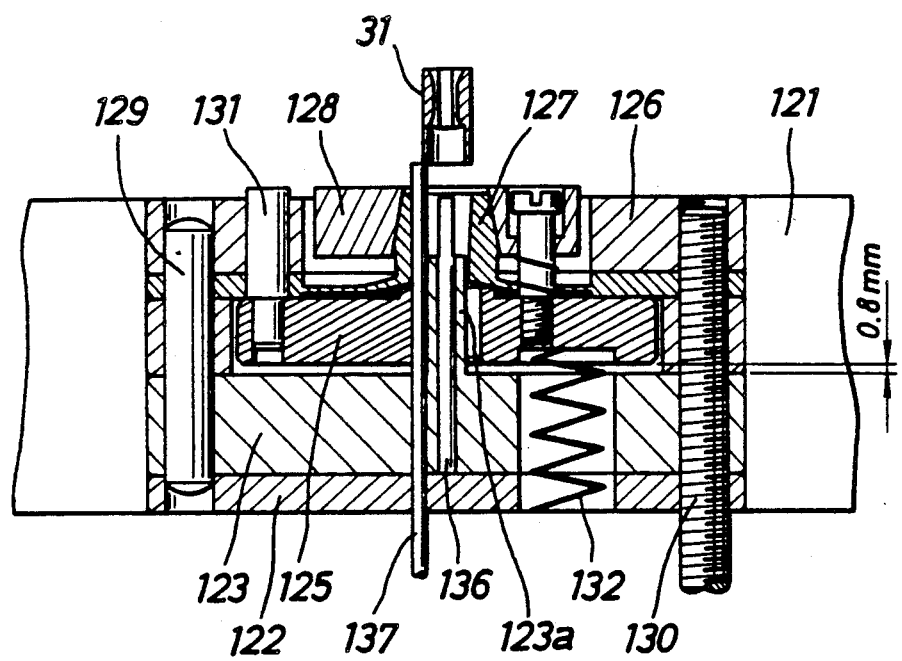
FIG. 15 is a sectional view showing a main part of the movable half mold in a state wherein the chuck is open.

FIG. 15 is a sectional view showing a state wherein a part is inserted/extracted to/from the movable die. A process method of the roller 31 will be described below with reference to FIG. 10.

When the movable half mold 102 is moved downward in FIG. 10, the movable cavity D 125 is biased by the spring 132 and is moved upward. The movable cavity G 128 biased by the spring 133 and fixed by the regulation pins 134 is then moved upward. As a result, the diaphragm 127 which has been biased is opened, as shown in FIG. 15. At this time, a chuck float amount is 0.8 mm. In this state, the roller 31 is set on the work mounting portion 123a, and the movable half mold 102 is brought into contact with the stationary half mold 101. With this operation, the movable cavity G 128 is pushed by stationary half mold 101, and the diaphragm chuck 127 is closed to reliably hold the roller 31. At the same time, the gate 112 of the stationary half mold 101 is set at a predetermined position of the roller 31. When a molten resin is injected from the gate 112 through the runner 110, the resin portion shown in FIG. 5 is formed. When the movable half mold 102 is moved again to be separated from the stationary half mold 101 at the PL 103, the diaphragm chuck 127 is opened, and the roller 31 is extracted from the movable half mold 102 with the aid of the function of the ejector pin 137. Subsequently, the above-described operation is repeated, i.e., setting the roller 31, matching the movable half mold 102 with the stationary half mold 101 at the PL 103, injecting a resin from the gate 112, and molding a part.

As described above, according to the molded roller 31, even if the resin portion 35 contracts after a lapse of a certain period of time, since this contraction occurs along the tapered surfaces 36, an outer diameter deviation of the pipe part 32 with respect to the axial hole 37 is as small as about 4 $\mu$m. That is, a high-precision finished product can be molded. The approximate dimensions of the roller 31 are: outer diameter, 4 mm; axial hole diameter, 1 mm; and length of the mold portion, 4 mm. SUS, BS (Brass), or the like is used as a material for the pipe part 32. POM (Polyoxymethylene) is used as the resin.

Figure 16:
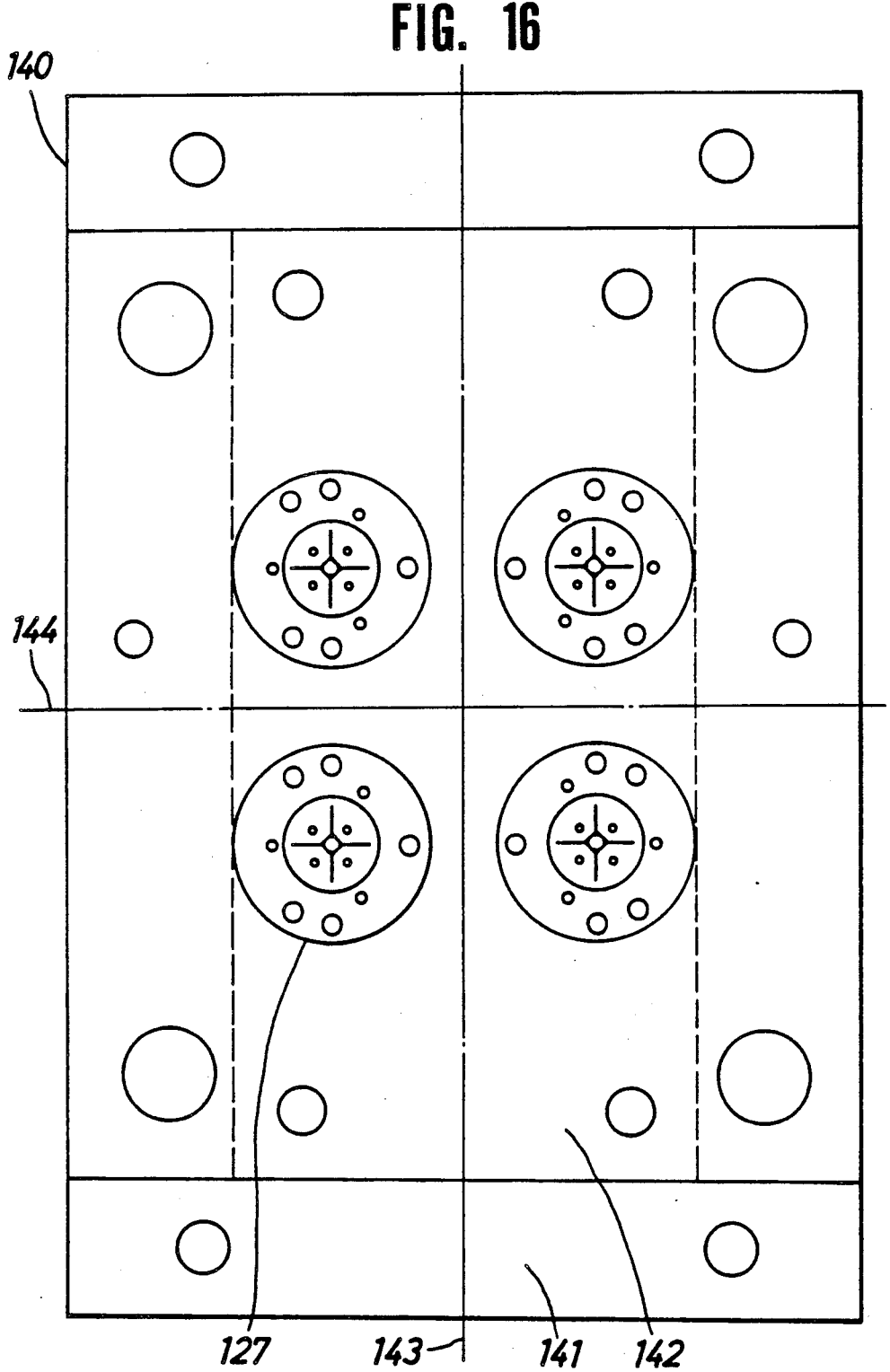
FIG. 16 is a plan view of a movable half mold for multiple molding.

FIG. 16 is a plan view of a movable half mold for multiple molding.

This movable half mold will be described below with reference to a sectional view of FIG. 12. A movable half mold plate 142 is fixed to a movable mounting plate 141 corresponding to the movable reception plate 120. Four diaphragm chucks 127 are arranged on the movable half mold plate 142. In a sectional view, an arrangement of each diaphragm chuck 127 is the same as that shown in FIG. 12. In a plan view, the diaphragm chucks 127 are arranged to be points symmetrical with each other about central lines 143 and 144 of a movable half mold 140.

The above-described method of holding/fixing the roller 31 by using the diaphragm chuck 127 allows not only reliable fixing of the roller 31 but also maintenance of high quality and precision of works even in multiple molding, thus greatly contributing to a reduction in cost.

The fourth embodiment of the present invention will be described with reference to FIGS. 17 and 18.

Figure 17:
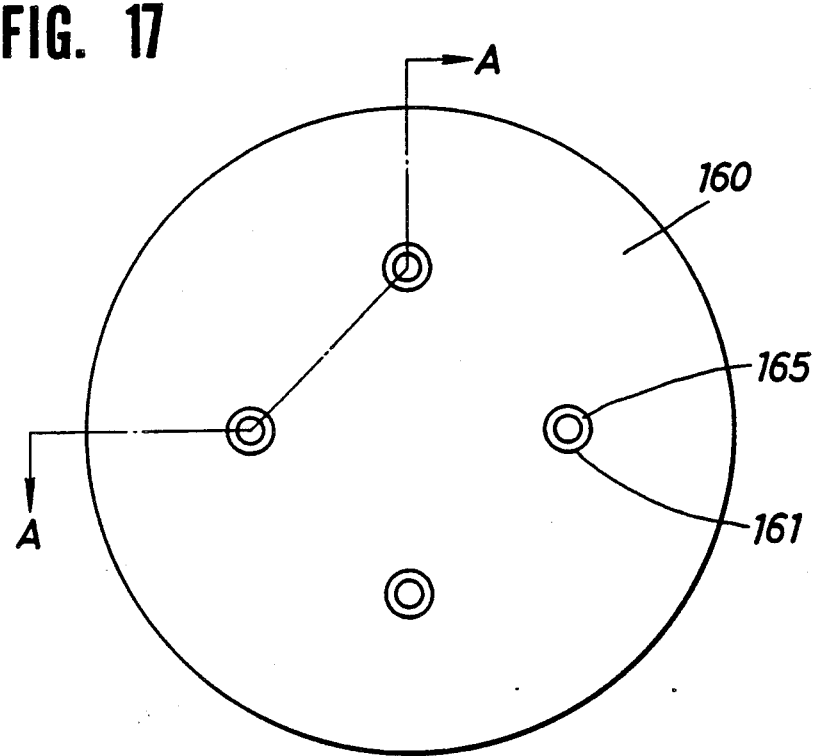
FIG. 17 is a sectional view of a plate member as an embodiment of a molded part according to the present invention.
Figure 18:
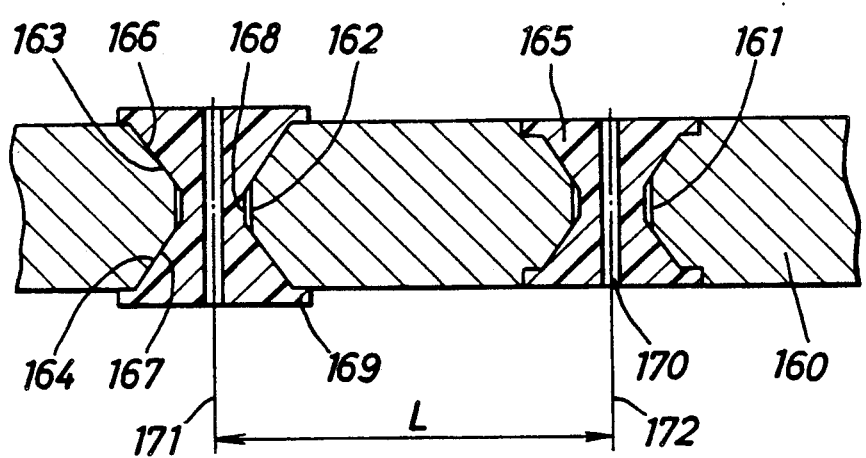
FIG. 18 is a sectional view of the slate member shown in FIG. 17 taken along line A—A.

FIG. 17 is a plan view of a molded part and FIG. 18 is a section of the molded part shown in FIG. 17 taken along the line A—A therein.

A plate member 160 has four holes 161 to be molded by injection. Each hole 161 has a straight portion 162 on its central portion and tapered surfaces 163 and 164 on its upper and lower ends. A molding member 165 is formed inside the holes 161. The molding member 165 has conical portions 166 and 167 formed facing the tapered surfaces 163 and 164, a cylindrical portion 168 formed by shrinkage of the resin between the conical portions 166 and 167, collar portions 169 on upper and lower ends thereof and a center hole 170 on the center thereof.

With such arrangement, no change will occur in distance L between center lines 171 and 172 of the center holes 170 as shown in FIG. 18 and it is possible to obtain a molded part having a precise distance between the center lines of the center holes.

In this way, the present invention is applicable to not only a pipe part but also other various members such as a plate member.

As has been described above, according to the present invention, a decrease in parts precision due to contraction of a resin which cannot be avoided in molding can be prevented by tapering the inner surface of a pipe part, and high precision of parts can be maintained in spite of contraction or a creep phenomenon, thus obtaining high-precision molded parts which cannot be obtained by the conventional technique.

In addition, by using a chuck having a displacement in a non-load state, a work can be reliably held and high work precision can be maintained. In addition, even if a mold for multiple molding is used, a reduction in cost can be ensured without decreasing the precision of each part.

What is claimed is:

1. An outsert molded part comprising an exterior work piece having a through hole including first and second continuous, conically shaped hole surfaces extending from respective ends of the through hole towards the other ends of the through hole, and a tubular resin insert disposed within the through hole, the insert having an axial opening extending over the full length thereof, the insert being mold formed inside the through hole to form exterior resin surfaces shaped complimentary to and in intimate contact with the conically shaped hole surfaces of the work piece, whereby the intimate contact between the work piece and the insert along the hole surfaces and the exterior resin insert surfaces is maintained during molding and after contractions of the insert following the mold forming.

2. A mold part according to claim 1 wherein the conically shaped hole surfaces extend over the full axial length of the through hole.

3. A molded part according to claim 1 wherein the through hole includes cylindrical through hole section between and contiguous with the conically shaped hole surfaces.

4. A molded part according to claim 1 wherein each conically shaped hole surface defines a cone angle in the range of between 40° to about 45°.

5. A molded part according to claim 1 wherein the work piece is a length of pipe.

* * * * *